(12) United States Patent
Park

(10) Patent No.: US 7,127,776 B2
(45) Date of Patent: Oct. 31, 2006

(54) DUAL DISPLAY TYPE PORTABLE COMPUTER AND CONTROL METHOD FOR THE SAME

(75) Inventor: Jun-Hyung Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 51 days.

(21) Appl. No.: 10/786,304

(22) Filed: Feb. 26, 2004

(65) Prior Publication Data
US 2004/0244146 A1 Dec. 9, 2004

(30) Foreign Application Priority Data
Jun. 4, 2003 (KR) .................. 10-2003-0035857
Sep. 19, 2003 (KR) .................. 10-2003-0064982

(51) Int. Cl.
*E05D 7/04* (2006.01)
(52) U.S. Cl. .................. 16/239; 248/278.1; 248/279.1
(58) Field of Classification Search .................. 16/239, 16/223, 231, 235, 236, 249; 248/276.1, 287.1, 248/278.1 X, 279.1 X, 282.1, 283.1, 917, 248/920, 921–923; 49/339; 361/683, 682, 361/681, 680, 814; 312/223.1, 223.2, 223.3; 455/575.3; 379/433.12, 433.13; 348/373, 348/376
See application file for complete search history.

(56) References Cited

U.S. PATENT DOCUMENTS 5,900,848 A * 5/1999 Haneda et al. ............... 345/1.1
6,016,171 A * 1/2000 Tsao ........................... 348/836
6,392,877 B1 * 5/2002 Iredale ........................ 361/683
6,464,195 B1 * 10/2002 Hildebrandt ................ 248/460
6,532,147 B1 * 3/2003 Christ, Jr. ................... 361/683
6,827,409 B1 * 12/2004 Michael .................... 312/223.3

FOREIGN PATENT DOCUMENTS

JP          02-127714          5/1990

OTHER PUBLICATIONS

Non-English language Korean Office issued Jun. 14, 2006.

* cited by examiner

Primary Examiner—Brian E. Glessner
Assistant Examiner—Mark Williams
(74) Attorney, Agent, or Firm—Fleshner & Kim, LLP (57) ABSTRACT

A dual display type portable computer can include a first unit having a first display module and a second unit rotatably coupled to the first unit having a second display module. At least one hinge unit can couple the first unit and the second unit with each other. The hinge unit can be coupled to corresponding positions of the first unit and the second unit to enable the first display module and the second display module to overlap each other or to be unfolded until they are placed in an equal plane. Preferably, at least one of the first display module and the second display module has a touch screen function. Preferably, the touch screen function can selectively change a language of a keyboard image. The first display module and the second display module can display different images or divided portions of one integrated image.

14 Claims, 10 Drawing Sheets

DUAL DISPLAY TYPE PORTABLE COMPUTER AND CONTROL METHOD FOR THE SAME

BACKGROUND OF THE INVENTION

1. Field of the Invention

The present invention relates to a portable computer, and more particularly to a dual display type portable computer.

2. Background of the Related Art

Figure 1:
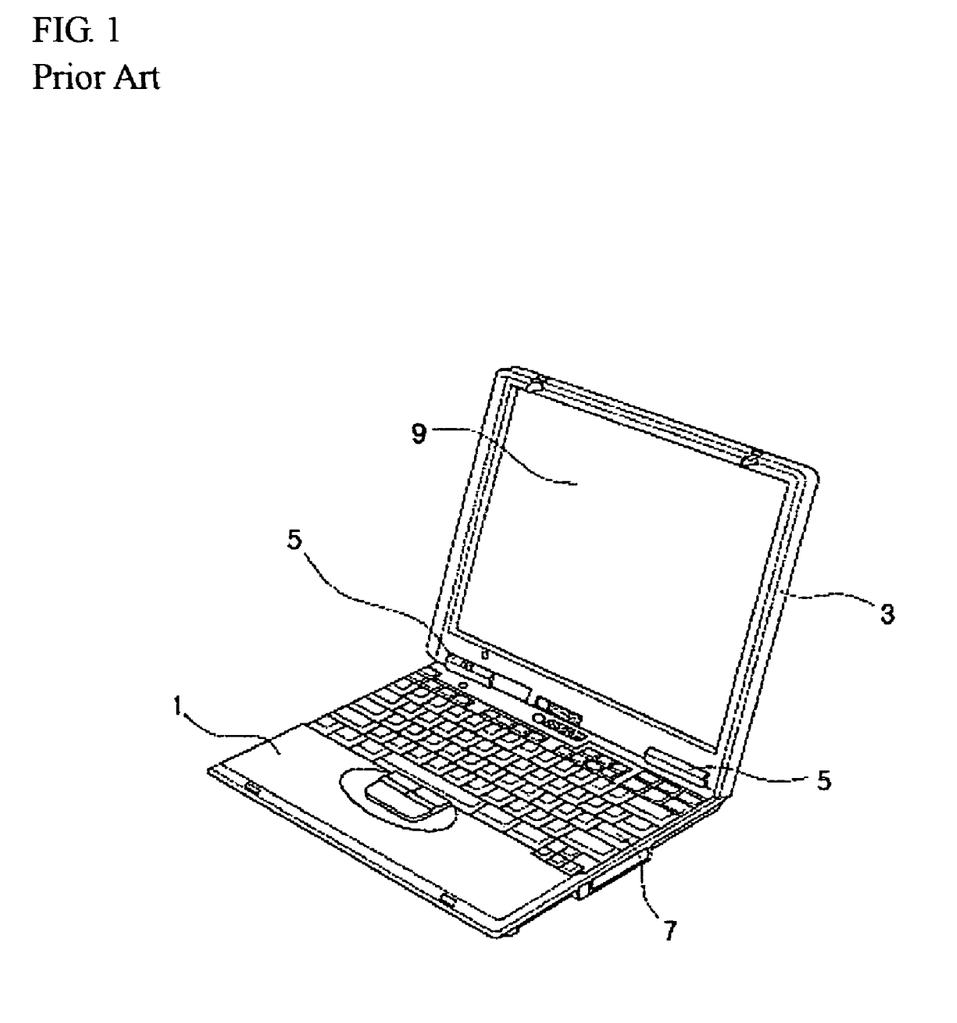
FIG. 1 is a perspective view of a prior art notebook computer.

FIG. 1 is a perspective view of a prior art notebook computer. As shown, a conventional notebook computer generally includes a body section 1 and a display section 3. The body section 1 and the display section 3 are connected with each other through a hinge unit 5. Through the hinge unit 5, the display section 3 is folded upon the body section 1 when the notebook computer is stored, and the display section 3 is unfolded from the body section 1 as shown in FIG. 1 when the notebook computer is used.

The body section 1 is shaped like a substantially flat board and contains a motherboard and various elements constituting the notebook computer. A keyboard 7, which operates as an input device, is disposed at an upper surface of the body section 1. The keyboard 7 has a plurality of keys arranged in multiple rows.

The display section 3 has a display module 9 on which various information is displayed. A liquid crystal panel is typically used as the display module 9. Signal lines are connected between the display section 3 and the body section 1 through the hinge unit 5 for transmission of signals between them.

A portable computer such as a notebook computer as described above has an integrated display section 3 including the display module 9, which is usually a liquid crystal panel, so that the portable computer can display a window screen image without a separate monitor in a simple and easy manner. Further, the display module 9 can display a video image reproduced by and outputted from an optical disc driver such as a CD driver or a DVD driver.

Meanwhile, a portable computer may be equipped with not only the display module such as a liquid crystal panel but also the display module 9 having input and output functions, such as a touch screen digitizer. In a touch screen as described above, a keyboard image may be displayed on a portion of the window screen image.

In such a portable computer having a touch screen as described above, a user can selectively input desired character buttons or key buttons in the keyboard image displayed on a portion of the window screen image. Also, a user can use the display module 9 to confirm or view a window screen image currently displayed by a liquid crystal display or a video image reproduced by and outputted from an optical disc driver.

As described above, however, the prior art portable computer has various disadvantages. For example, in order to use a portable computer with a large screen for displaying, e.g., a motion picture or performing such work as CAD or Spread Sheet, the portable computer needs to be connected with a separate monitor having a relatively large size, thereby causing inconvenience in use of the computer. Further, the keyboard device has only a specific language set in advance. Therefore, some device is necessary in order to input another language, for example, another keyboard must be connected to the portable computer.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a portable computer that has a display screen on a main body and a display body.

Another object of the present invention to provide a portable computer that has a plurality of displays so that the portable computer can display a relatively large screen.

Another object of the present invention to provide a portable computer that has a plurality of displays so that the portable computer can use one display screen as an input device.

Another object of the present invention to provide a portable computer that has a plurality of displays and a hinge mechanism allowing a reduced separation between the displays.

Another object of the present invention to provide a portable computer that has a plurality of displays so that the displays can be unfolded from a body of the portable computer at various angles with respect to the body.

To achieve at least these objects and other advantages in a whole or in part and in accordance with the purpose of the invention, as embodied and broadly described herein, there is provided a hinge unit of a portable computer, the hinge unit including a fixed hinge plate fixed to a first unit having a first display module, the fixed hinge plate having a first hinge cylinder, a hinge link having a first hinge shaft rotatably inserted in the first hinge cylinder, the hinge link connecting the first unit with a second unit having a second display module, a movable hinge bracket assembled with the second unit and configured to be rotated about a second hinge shaft, the movable hinge bracket having a guide section for guiding the hinge link that is movably inserted through the movable hinge bracket, and a stopper disposed at a corresponding portion between the hinge link and the guide section of the movable hinge bracket to prevent the hinge link from moving with respect to the movable hinge bracket.

To further achieve at least these objects and other advantages in a whole or in part and in accordance with the purpose of the invention, as embodied and broadly described herein, there is provided a portable computer that includes a first unit having a first display module, a second unit being capable of being folded on and unfolded from the first unit, and a hinge mechanism configured to support reciprocal folding movements of the first and second units, wherein the hinge mechanism is positioned along a lateral area between the first display module and an outer lateral edge of the first unit.

To further achieve at least these objects and other advantages in a whole or in part and in accordance with the purpose of the invention, as embodied and broadly described herein, there is provided a dual display control method for a portable computer that includes displaying a window screen image and an input device image on a first display module and a second display module, respectively, which are included in the portable computer, and displaying at least one window screen image on both the first display module and the second display module according to a selection signal.

To further achieve at least these objects and other advantages in a whole or in part and in accordance with the purpose of the invention, as embodied and broadly described herein, there is provided a portable computer that includes a first module configured with a first display screen, and second module rotatably coupled to the first module and configured with a second display screen.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2A:
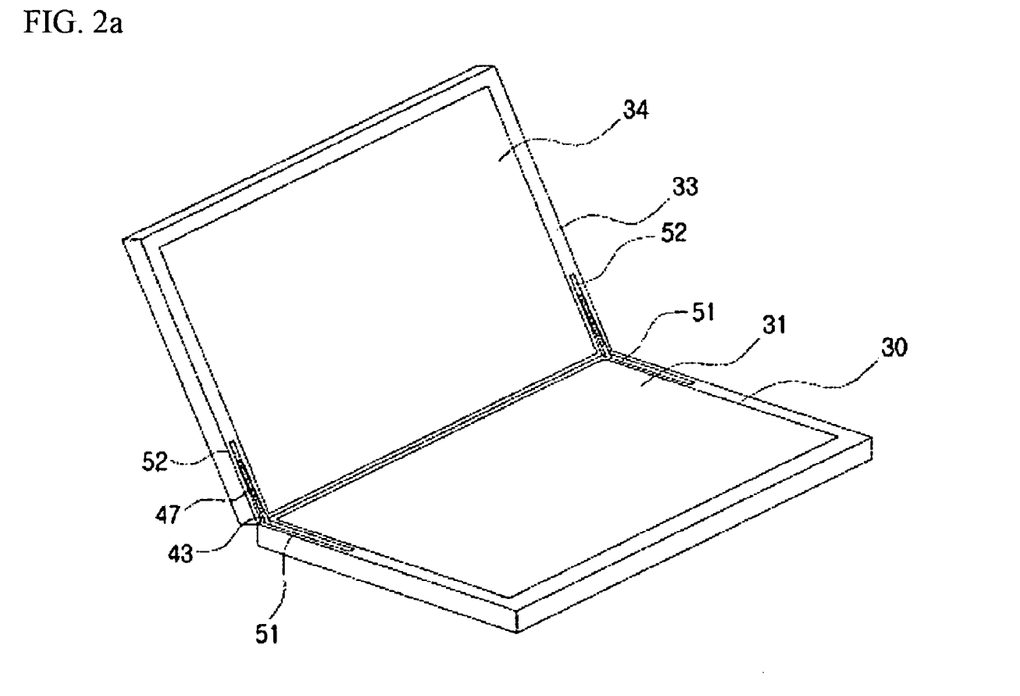
FIGS. 2a and 2b are diagrams showing schematic perspective views of a dual display type portable computer according to a preferred embodiment of the present invention.
Figure 2B:
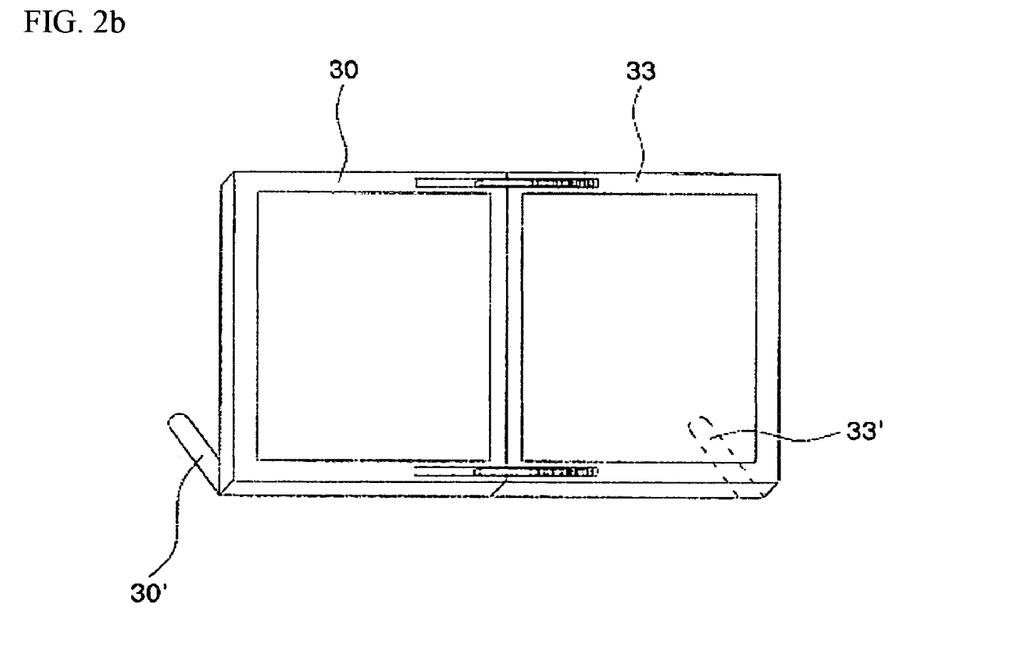
Figure 3A:
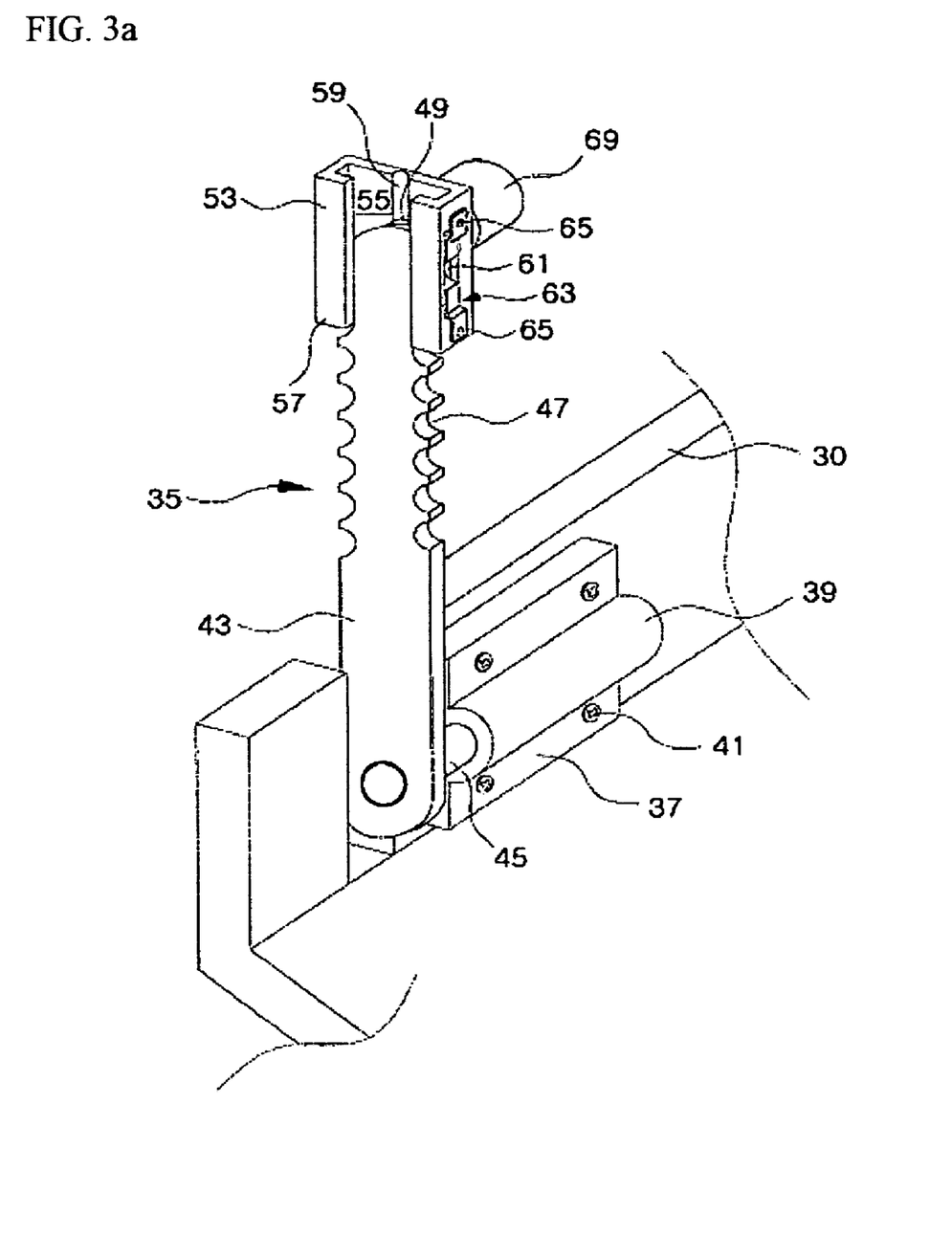
FIGS. 3a and 3b are diagrams showing exploded perspective views of an exemplary hinge unit employed in a dual display type portable computer according to a preferred embodiment of the present invention.
Figure 3B:
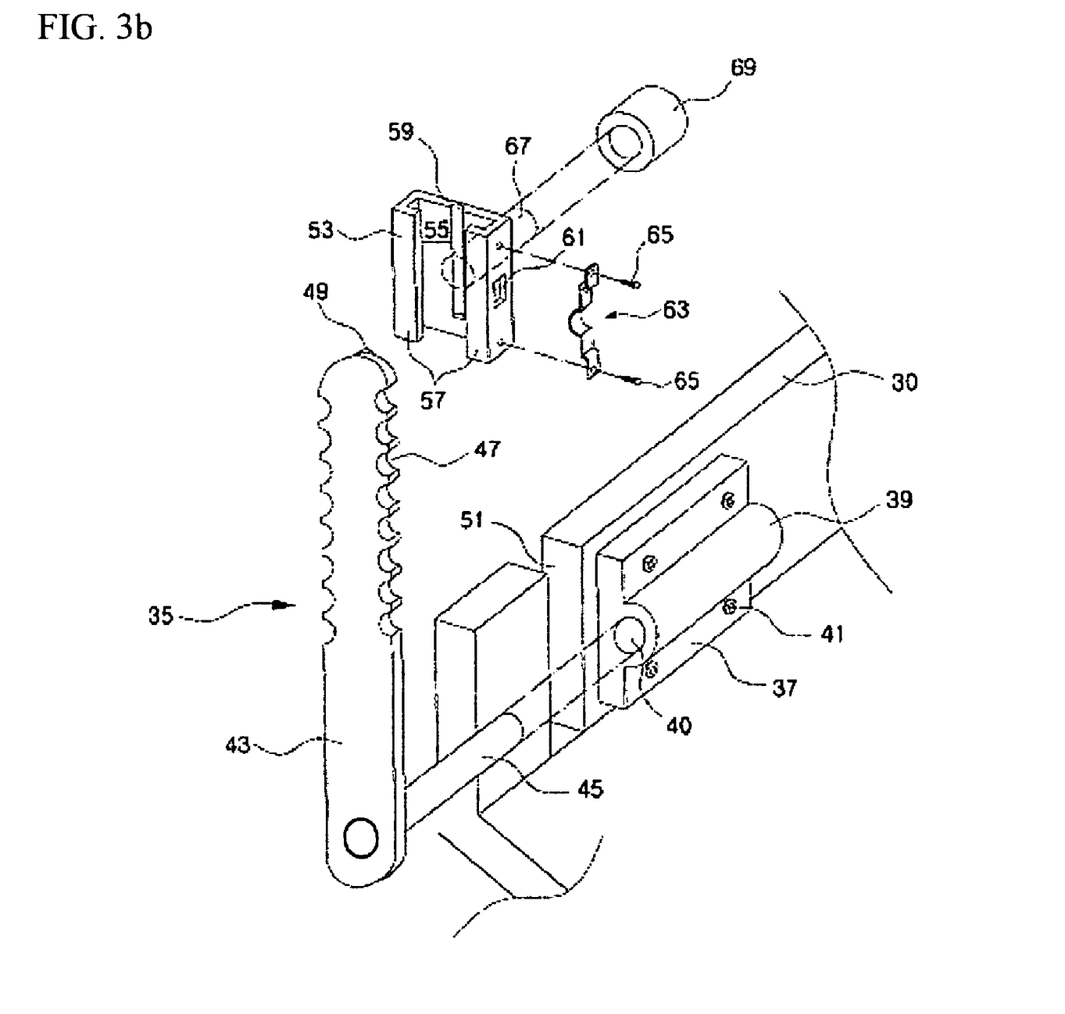

FIGS. 2a and 2b are schematic perspective views of a dual display type portable computer according to an embodiment of the present invention. FIGS. 3a and 3b are perspective views of an exemplary hinge unit according to embodiments of the present invention.

As shown in FIGS. 2a–3b, a dual display type portable computer according to an embodiment of the present invention can include a first unit 30, a second unit 33, and a hinge unit 35. The first unit 30 and the second unit 33 correspond to a body section and a display section of a general notebook computer and are rotatably coupled to each other through the hinge unit 35. The hinge unit 35 can be assembled near lateral rear ends of the first unit 30 and the second unit 33.

The first unit 30 and the second unit 33 have a first display module 31 and a second display module 34, respectively. Both the first display module 31 and the second display module 34 can be liquid crystal panels or the like for displaying a window screen. At least one of the first display module 31 and the second display module 34, preferably the first display module 31 in the first unit 30, may have a touch screen function (e.g., selectable by physical pressure or a sensor and a corresponding input device).

In each of the first unit 30 and the second unit 33, a rim surrounding the first display module 31 or the second unit 33 has a side adjacent to the hinge unit 35, which can be narrower than the other sides of the rim. One reason for such relatively narrower sides of the rims of the first unit 30 and the second unit 33 is to reduce or minimize a separation between screens of the first display module 31 and the second unit 33 when the first display module 31 and the second unit 33 display corresponding information or one integral image.

A construction of the exemplary hinge unit 35 that couples the first unit 30 and the second unit 33 with each other in such a manner as to enable them to be folded on or unfolded from each other will now be described. As shown in FIG. 3a, in the hinge unit 35, the portion connected with the first unit 30 can be a fixed hinge plate 37. The fixed hinge plate 37 can be assembled on an inner surface of a rear end of the first unit 30.

The fixed hinge plate 37 has a first hinge cylinder 39 having a predetermined length. A hinge hole 40 can extend longitudinally through the first hinge cylinder 39. In order to increase contact area between a first hinge shaft 45 and an inner surface of the hinge hole 40, the first hinge cylinder 39 is relatively long. Increasing the contact area between the first hinge shaft 45 and an inner surface of the hinge hole 40 can reduce the chance or prevent the first hinge shaft 45 from being too easily rotated. Alternatively, a predetermined damping construction or the like may be arranged inside of the first hinge cylinder 39 so as to prevent the first hinge shaft 45 from being too easily rotated.

The fixed hinge plate 37 can be fixed by fixing screws 41, which are screwed through corner portions of the fixed hinge plate 37 above and under the first hinge cylinder 39. It is preferred that the hinge hole 40 is formed at a vertically central portion of the first unit 30.

A hinge link 43 can pivotally couple the first unit 30 and the second unit 33 with each other. The hinge link 43 can have the first hinge shaft 45 rotatably inserted in the hinge hole 40 of the fixed hinge plate 37. The first hinge shaft 45 can have a length corresponding to the length of the hinge hole 40.

The hinge link 43 can have a plurality of stopper grooves 47 or the like formed along opposite longer sides of the hinge link 43. When the second display module 34 has been unfolded from the first unit 30 at a predetermined angle, the stopper grooves 47 can prevent a movable hinge bracket 53 from being moved down along the hinge link 43 by the weight of the second display module 34.

An engagement protuberance 49 can prevent the hinge link 43 from being separated from the movable hinge bracket 53. The engagement protuberance 49 can be at a distal end of the hinge link 43. Further, the engagement protuberance 49 can reduce or prevent the first unit 30 and the second unit 33 from being separated or disengaged from each other. The engagement protuberance can operate even when there exists no other connection between the first unit 30 and the second unit 33. Therefore, when a predetermined construction that can prevent the first unit 30 and the second unit 33 from disengaging each other exists at another portion of the computer, the engagement protuberance 49 may be unnecessary.

The first unit 30 and the second unit 33 preferably have a first hinge slot 51 and a second hinge slot 52, respectively, which enable the hinge link 43 to rotatably couple the first unit 30 and the second unit 33 with each other. The first hinge slot 51 can be formed through a rear surface and a portion of an upper surface of the first unit 30. The second hinge slot 52 can be formed through a rear surface and a portion of an upper surface of the second unit 33, corresponding to the location of the first hinge slot 51. However, the present invention is not intended to be so limited. For example, corresponding openings or holes in a rear surface may be used.

It is preferred that two hinge units 35 couple the first unit 30 and the second unit 33 with each other at two portions between them. In the embodiment shown in FIGS. 2a–2b, the first hinge slot 51 and the second hinge slot 52 are formed at each of the opposite sides of the first unit 30 and the second unit 33.

The movable hinge bracket 53 can be assembled with the second unit 33. When the second unit 33 rotates with respect to the first display module 31, the movable hinge bracket 53 can guide the hinge link 43 while rotating together with the second unit 33. For this, a guide section 55 having an opening in one direction or the like can be arranged in the movable hinge bracket 53. The guide section 55 can include guide rails 57 for guiding the opposite lengthy sides of the hinge link 43. However, the guide rails 57 may be coupled with each other or the like to form a closed guide section 55 without an opening instead of having the guide rails 57.

The movable hinge bracket 53 can have an engagement protuberance channel 59 in which the engagement protuberance 49 can be located and guided. The engagement protuberance channel 59 is preferably formed through the movable hinge bracket 53 and extends a predetermined length from an upper end of the movable hinge bracket 53 so that the engagement protuberance 49 can be guided along the engagement protuberance channel 59. Therefore, when the engagement protuberance 49 is engaged with a lower end of the engagement protuberance channel 59, the hinge link 43 cannot move any more relative to the movable hinge bracket 53. Of course, the hinge link 43 can move in the opposite direction.

The movable hinge bracket 53 can have a stopper hole 61 in which a stopper 63 is located. The stopper 63 may be a leaf spring or the like. The stopper 63 has a central portion that can protrude inward of the guide section 55 through the stopper hole 61. Further, the stopper 63 has opposite ends that are fixed to the movable hinge bracket 53 by stopper screws 65. The central portion of the stopper 63 protruding inward of the guide section 55 can be selectively located in one of the stopper grooves 47 to maintain the second unit 33 at a selected location with respect to the hinge link 43 or the first unit 30. However, the present invention is not intended to be so limited. The stopper grooves 47 and the stopper 63 arrangement can be correspondingly changed as long as they have a functional engagement to selectively hold the first unit 30 and the second unit 33 between the open and closed positions.

As shown in FIG. 3b, the movable hinge bracket 53 is preferably held rotatably about a second hinge shaft 67 in the second unit 33. One end of the second hinge shaft 67 is rotatably inserted in a second hinge cylinder 69 and the other end of the second hinge shaft 67 is fixed to the movable hinge bracket 53. The second hinge cylinder 69 can be fixed to an inner portion of the second unit 33. It is preferred that the second hinge cylinder 69 has an inner construction for preventing the second hinge shaft 67 from being rotated too easily.

As shown in FIG. 2b, the first unit 30 and the second unit 33 can have supports 30' and 33', respectively. The supports 30' and 33' can enable the first unit 30 and the second unit 33 to be supported on the ground or a flat surface when they have been unfolded (e.g., making an angle of 180° with respect to each other).

Figure 4:
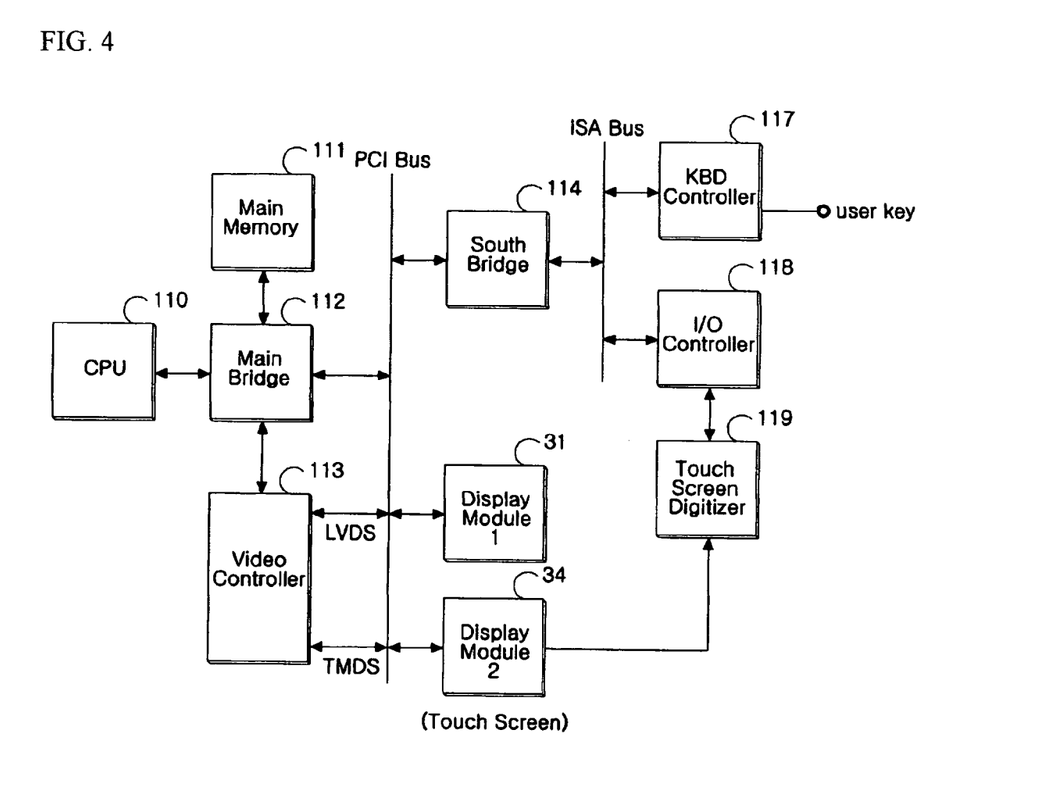
FIG. 4 is a block diagram showing an exemplary control configuration for a dual display type portable computer according to a preferred embodiment of the present invention.

FIG. 4 is a block diagram showing an exemplary control system for a dual display type portable computer according to an embodiment of the present invention. As shown in FIG. 4, a dual display type portable computer control system can include a CPU 110, a main memory 111, a north bridge 112, a video controller 113, a south bridge 114, a first display module 31, a second display module 34, a KBD controller 117, an I/O controller 118, and a touch screen digitizer 119, which can be contained in the first unit 30 or the second unit 33.

The first display module 31 can be a liquid crystal panel for displaying a window screen image. Accordingly, the second display module 34 can preferably have a touch screen function for displaying a keyboard image in a predetermined language selected by a user or displaying a window screen in a vertical or horizontal direction.

Further, the first display module 31 can display a video image outputted through a low voltage differential signaling (LVDS) port arranged at the video controller 113 or the like. The second display module 34 can display a video image outputted through a transition minimized differential signaling (TMDS) port arranged at the video controller 113 or the like. The touch screen digitizer can be installed at the touch screen (e.g., a front surface of the the second display module 34) so that coordinates of a position touched or selected, for example, by a user can be outputted to the I/O controller 118.

Figure 5:
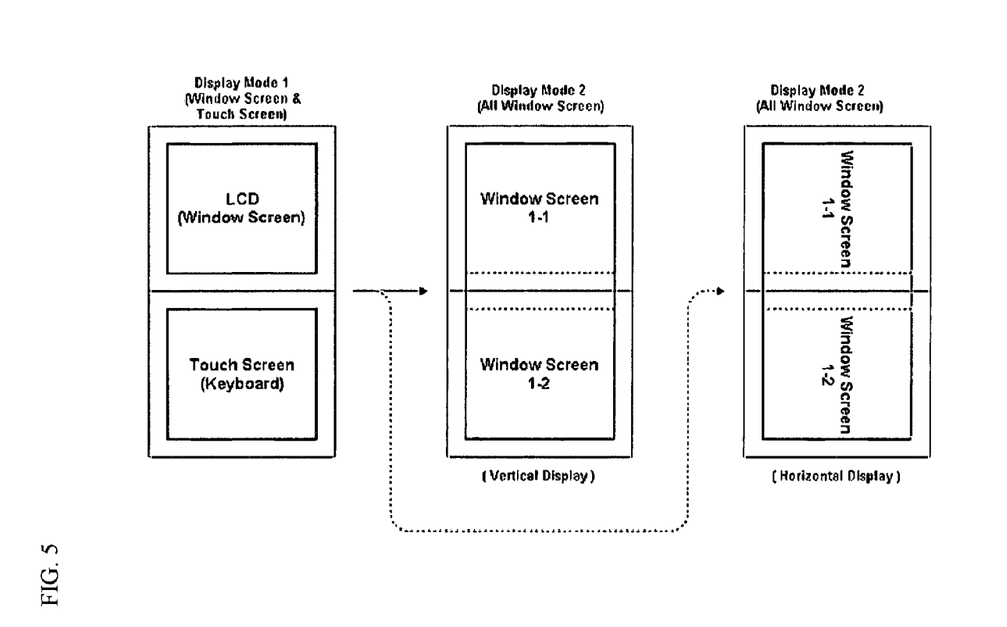
FIG. 5 is a diagram showing a front view showing screens for exemplary dual display states of a dual display type portable computer according to a preferred embodiment of the present invention.

Further, the KBD controller 117 can detect a key button selected by the user, for example, a toggle key value for requesting a change of a display mode. However, the present invention is not intended to be so limited as other input devices or functions can be used to change a display mode. As shown in FIG. 5, in a first display mode in which the first display module 31 displays a window screen image and the second display module 34 displays a keyboard image, if a toggle key is selected and pressed one time by a user, the video controller 113 can change the first display mode into a second display mode in which both the first display module 31 and the second display module 34 display window screen images.

In a dual display mode, that is, in the second display mode in which both the first display module 31 and the second display module 34 display window screen images as described above, the video controller 113 or the like can control the first display module 31 and the second display module 34 to perform a horizontal or vertical dual display operation according to selection by the user. Further, an additional input device can be coupled to the portable computer such as an extended keyboard. In addition, one section can be a reversible (e.g., two-sided) display.

Figure 6:
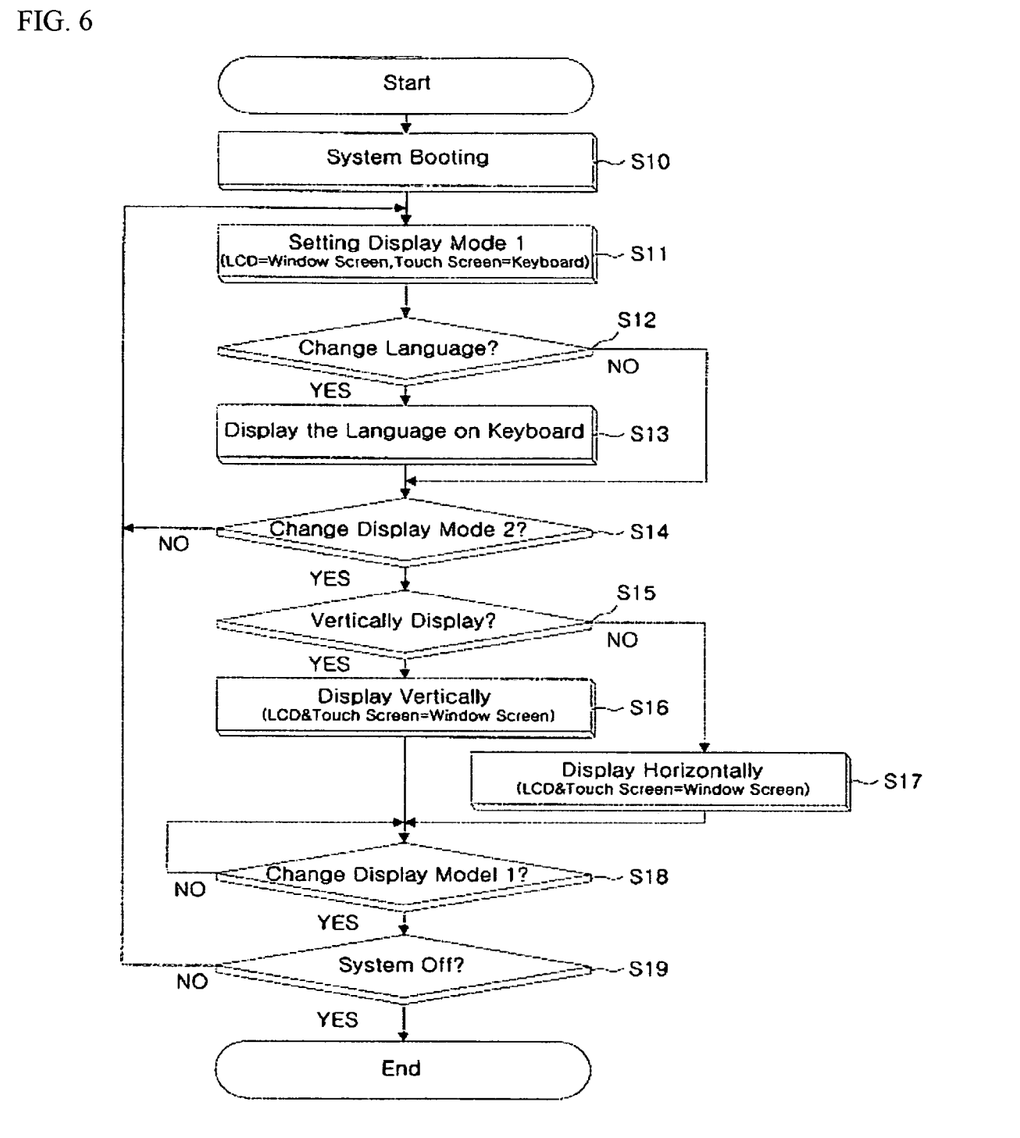
FIG. 6 is a flowchart showing a preferred embodiment of a dual display control method for a portable computer according to the present invention.

FIG. 6 is a flowchart of an embodiment of a dual display control method for a portable computer according to the present invention. The embodiment of a dual display control method can be applied to and will be described using the embodiment of a portable computer of FIGS. 2a–2b and the exemplary control configuration of FIG. 4. However, the present invention is not intended to be so limited.

As shown in FIG. 6, after a process starts, a portable computer can perform a system booting operation (block S10), using a predetermined display mode set in advance (e.g., as a default display mode). For example, the first display mode may be set as a default, so that the first display module 31 displays a window screen image and the second display module 34 displays a keyboard image (block S11).

Therefore, the user of the portable computer can see a window screen through the first display module 31 and input information through the keyboard displayed on the second display module 34. When the user requests change of the language used for the keyboard (block S12), for example, when the user requests change from Korean keyboard to Japanese keyboard, the second display module 34 can display a changed keyboard (e.g., a Japanese keyboard) according to the request of the user (block S13).

Further, in the first display mode in which the first display module 31 displays a window screen image and the second display module 34 displays a keyboard image, a user can request change from the current first display mode to the second display mode (block S14). Accordingly, the dual display type of the second display mode that can be set in advance or additionally selected by the user is supported.

For example, when the vertical dual display type as shown in FIG. 5 has been confirmed (block S15), the portable computer vertically displays a window screen image (e.g., an integrated or scrollable display) on the first display module 31 and the second display module 34 (block S16). In contrast, when the horizontal dual display type has been confirmed, portable computer horizontally displays a window screen image (e.g., an integrated or scrollable display) on the first display module 31 and the second display module 34 (block S17). In addition, other variations of display types can be provided for in each of the first and second display modes (e.g., corresponding separate split screens).

In the vertical or horizontal display of the first display module 31 and the second display module 34 described above, either an independent image may be displayed on each of the first display module 31 and the second display module 34 or divided portions of one large integrated screen image such as a dynamic video may be distributed and displayed on the first display module 31 and the second display module 34. Using such an integrated screen image approach, the user can see a movie with a large screen or conveniently perform such work as CAD or Spread Sheet.

Also, in the second display mode in which both the first display module 31 and the second display module 34 can display at least one window screen image, when the user requests change from the current second display mode to the first display mode (block S18), the second display mode is changed to the first display mode, so that the first display module 31 displays a window screen image and the second display module 34 displays a keyboard image. Such described processes can be repeated until the system is off (block S19).

Operations of a dual display type portable computer according to an embodiment of the present invention will now be described. In using the portable computer according to embodiments of the present invention, the first unit 30 and the second unit 33 may be posed with various angles with respect to each other. For example, when the portable computer is used in such a manner as a general notebook computer, the second unit 33 may be unfolded from the first unit 30 with an angle as shown in FIG. 2.

Further, the first display module 31 and the second display module 34 may be completely unfolded from each other to be placed in the same plane (e.g., display screens). In this configuration, the first display module 31 and the second display module 34 can display divided portions of one integrated image in a prescribed relation.

Figure 7A:
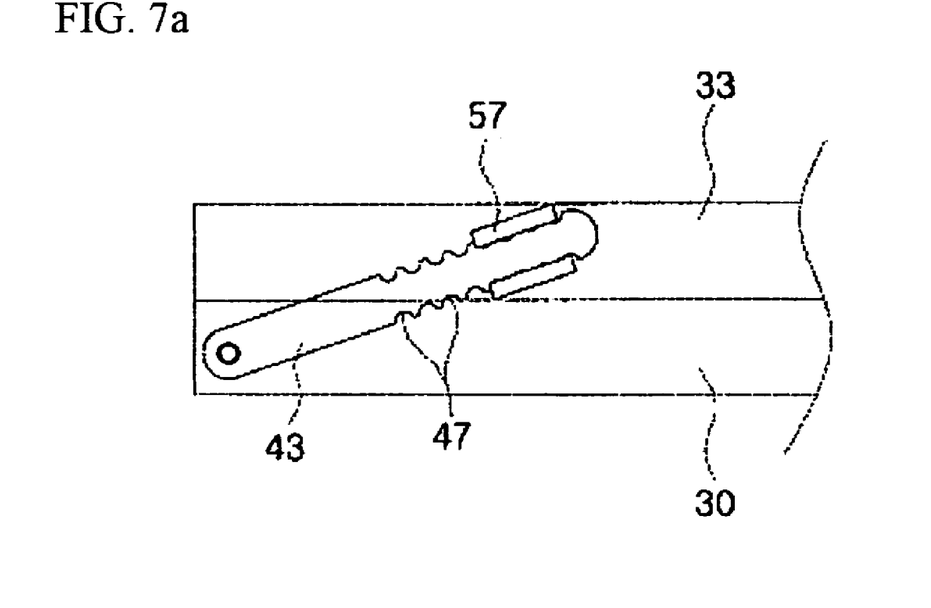
FIGS. 7a to 7e are diagrams showing side views of a portion of a portable computer according to a preferred embodiment of the present invention.

Relative rotation of the first unit 30 and the second unit 33 according to an embodiment will be described below with reference to FIGS. 7a to 7e. First, FIG. 7a shows a state in which the first unit 30 and the second unit 33 overlap each other. In this state, the hinge link 43 can extend from the first unit 30 to the second unit 33 with a prescribed inclination. Also, the movable hinge bracket 53 can extend with the same inclination as that of the hinge link 43.

Figure 7B:
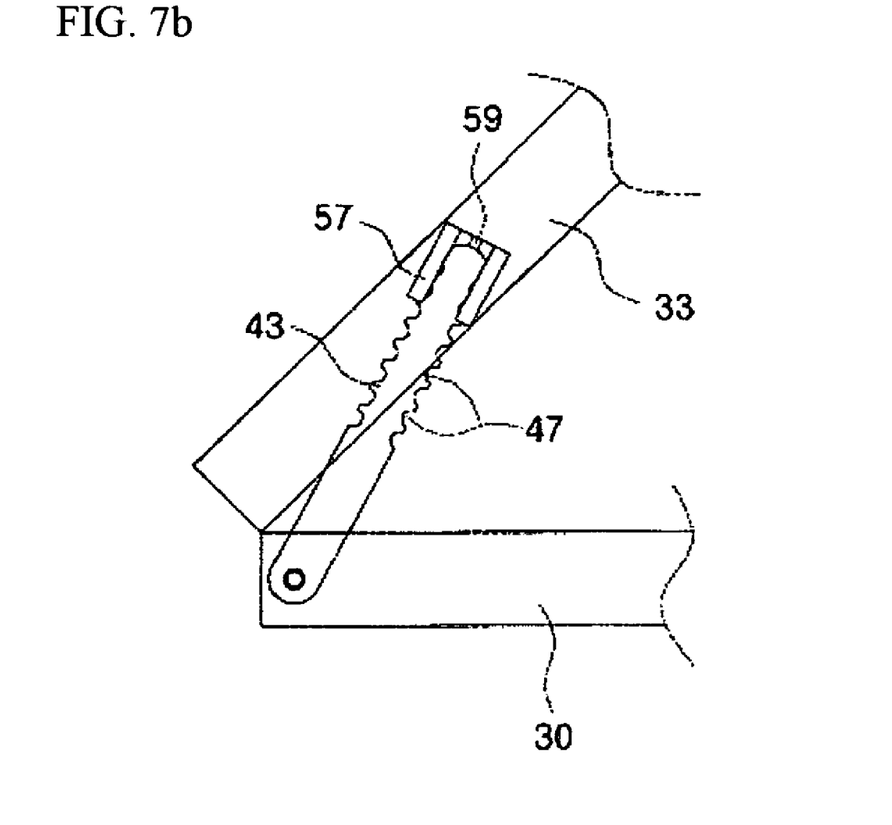

When the second unit 33 starts to be unfolded from the first unit 30 from the state described above, the hinge link 43 preferably rotates about the first hinge shaft 45 simultaneously while the guide section 55 of the movable hinge bracket 53 moves relatively to the hinge link 43. At the same time, the movable hinge bracket 53 can rotate about the second hinge shaft 67. FIG. 7b shows a state in which the second unit 33 has been unfolded from the first unit 30 with an acute angle.

Figure 7C:
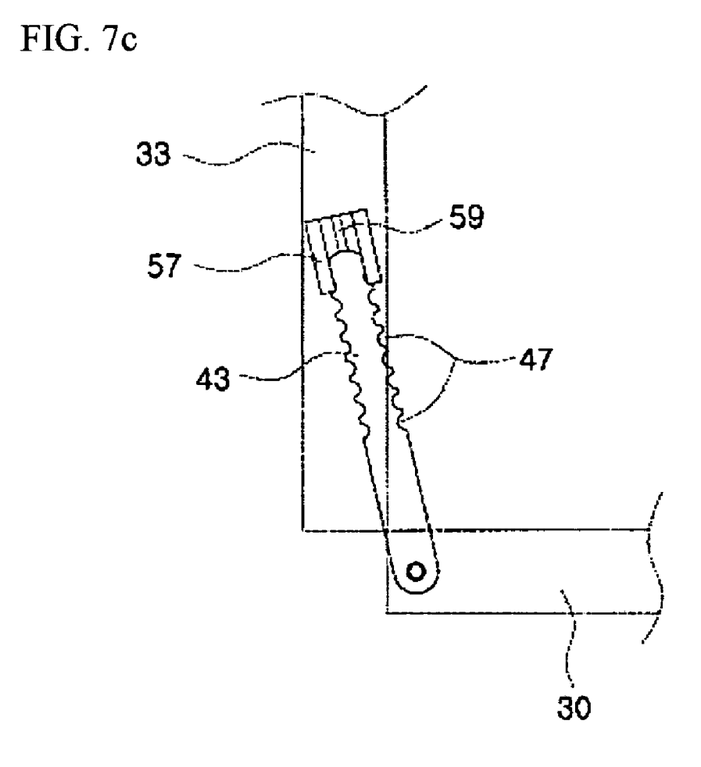
Figure 7D:
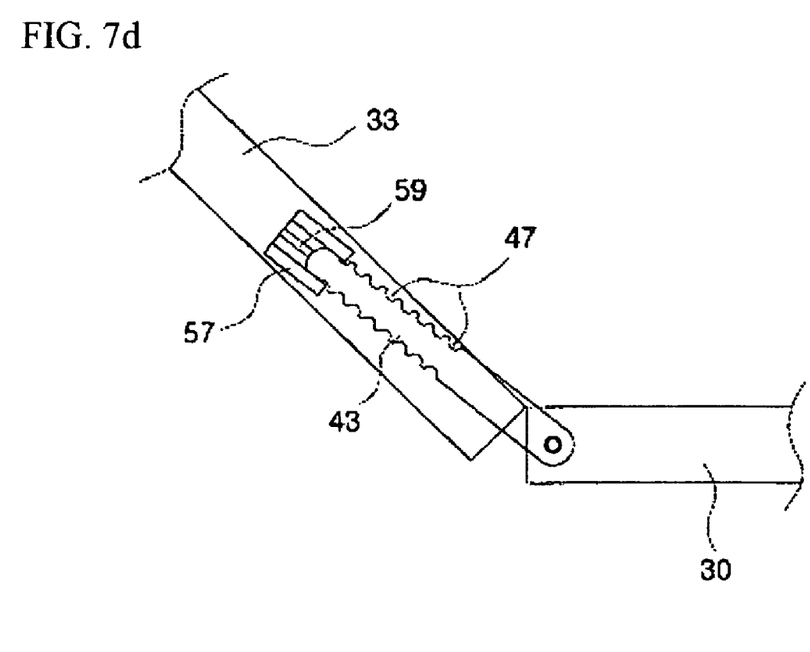

When the second unit 33 goes on rotating, the first unit 30 and the second unit 33 can experience the states shown in FIGS. 7c and 7d. In the states shown in FIGS. 7c and 7d, the first unit 30 and the second unit 33 can be prevented from being too easily rotated due to friction between the first hinge shaft 45 and the first hinge cylinder 39 and between the second hinge shaft 67 and the second hinge cylinder 69. However, the present invention is not intended to be so limited.

Further, the central portion of the stopper 63 engaged with the stopper groove 47 prevents the second unit 33 from being lowered along the hinge link 43 by its own weight. The location of the stopper groove 47 with which the central portion of the stopper 63 can be engaged changes according to the rotation of the second unit 33 with respect to the first unit 30.

Figure 7E:
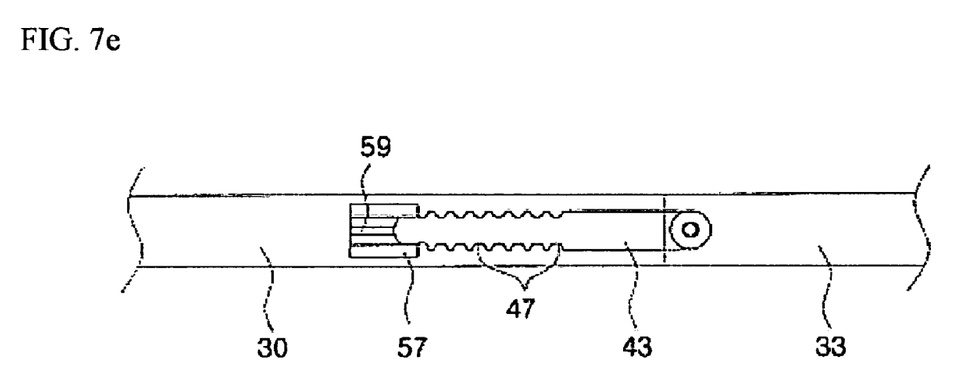

FIG. 7e shows a state in which the first display module 31 of the first unit 30 and the second display module 34 of the second unit 33 are placed in the same plane. In this state, the hinge link 43 can extend through the first hinge slot 51 and the second hinge slot 52 formed through the rear surfaces of the first unit 30 and the second unit 33.

Preferably engagement protuberance 49 can be engaged with a lower end of the engagement protuberance channel 59 when the rotational radius becomes open or a maximum during the rotation of the first unit 30. Beneficially, such construction can reduce or minimize the length of the hinge link 43 and can prevent the first unit 30 and the second unit 33 from being separated even without another construction for assembling the first unit 30 and the second unit 33 with each other.

Although embodiments of the present invention have been described for illustrative purposes, those skilled in the art will appreciate that various modifications, additions and substitutions are possible, without departing from the scope and spirit of the invention as disclosed in the accompanying claims. For example, construction of the stopper 63 and the stopper grooves 47 described above, which allow the second unit 33 to be unfolded and posed only at several predetermined angles with respect to the first unit 30, may be modified. That is to say, the stopper 63 may be disposed in elastic and tight contact with the hinge link 43 without the stopper grooves 47. In such a construction, the angle between the first unit 30 and the second unit can continuously increase when the second unit 33 is unfolded from the first unit 30, and the second unit 33 can be held at any angle with respect to the first unit 30 while the second unit 33 is unfolded from the first unit 30.

Further, the hinge link 43 and the movable hinge bracket 53 may be disposed on outer surfaces of the first unit 30 and the second unit 33, which can make the first hinge slot 51 and the second hinge slot 52 unnecessary. In such a case, it will do if the first hinge shaft 45 and the second hinge shaft 67 extend through the first unit 30 and the second unit 33, respectively, or are coupled to exterior surfaces thereof.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a portable computer and methods of using same have various advantages. In embodiments of a dual display type portable computer according to the present invention, both the first unit and the second unit have display modules so that a user can selectively use the display modules. Accordingly, a user can see a movie on a large screen, can more conveniently perform work such as CAD or Spread Sheet with large transportable display surfaces. Further, a user can input a desired language without connecting a separate keyboard in an easy and simple manner. Also, in embodiments of a portable computer and methods thereof, the first unit and the second unit having display modules can be selectably unfolded from each other with various angles, and the display modules of the first and second units can be placed in the same plane.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A hinge unit of a portable electronic device, the hinge unit comprising:
    a fixed hinge plate fixed to a first unit having a first display module, the fixed hinge plate having a first hinge cylinder;
    a hinge link having a first hinge shaft rotatably inserted in the first hinge cylinder, the hinge link connecting the first unit with a second unit having a second display module;
    a movable hinge bracket assembled with the second unit and configured to be rotated about a second hinge shaft, the movable hinge bracket having a guide section for guiding the hinge link that is movably inserted through the movable hinge bracket; and
    a stopper disposed at a corresponding portion between the hinge link and the guide section of the movable hinge bracket to control the hinge link movement with respect to the movable hinge bracket, wherein the hinge link extends through hinge slots formed through rear ends of the first and second units to couple the first and second units with each other.

2. The hinge unit as claimed in claim 1, wherein the first unit is one of a main body and a display body, and the second unit is the other of the main body and the display body.

3. The hinge unit as claimed in claim 1, wherein the hinge link has an engagement protuberance formed at a distal end of the hinge link, and the movable hinge bracket has an engagement protuberance channel, in which the engagement protuberance is located and guided, and wherein the engagement protuberance prevents the hinge link from being separated from the movable hinge bracket when the engagement protuberance is engaged with a lower end of the engagement protuberance channel.

4. The hinge unit as claimed in claim 1, wherein the hinge unit is positioned along a lateral area between the second display module and an outer lateral edge of the second unit.

5. The hinge unit of claim 4, wherein the hinge unit is coupled to tear ends of corresponding sides of the first unit and the second unit to enable the first display module and the second display module to overlap each other or to be unfolded until they are placed in an equal plane.

6. A portable computer, comprising:
    a first unit having a first display module;
    a second unit being capable of being folded on and unfolded from the first unit; and
    a hinge mechanism configured to support reciprocal folding movements of the first and second units, wherein the hinge mechanism is positioned along a lateral area between the first display module and an outer lateral edge of the first unit, wherein the hinge mechanism comprises,
        a fixed hinge plate fixed to the first unit, the fixed hinge plate having a first hinge cylinder through which a hinge hole is formed,
        a hinge link having a first hinge shaft rotatably inserted in the hinge hole, the hinge link assembled with the first unit and the second unit to connect the first unit and the second unit with each other,
        a movable hinge bracket assembled with the second unit in such a manner that the movable hinge bracket can be rotated about a second hinge shaft, the movable hinge bracket having a guide section for guiding the hinge link that is movably inserted through the movable hinge bracket, and
        a stopper configured to resistively prevent the hinge link from relatively moving with respect to the movable hinge bracket, wherein the hinge link extends through hinge slots formed through rear ends of the first and second units to connect the first and second units with each other.

7. The portable computer of claim 6, wherein the second unit has a second display module and the hinge mechanism is positioned along a lateral area between the second display module and an outer lateral edge of the second unit.

8. The portable computer of claim 7, wherein the first and second units have top surfaces respectively containing the display modules, and wherein when the second unit moves from the folded to an unfolded position, the hinge mechanism extends though corresponding removed portions of facing adjacent sides of the rear ends of the first and second units.

9. The portable computer of claim 8, wherein a rear edge of the top surface of the first unit adjacent the first display module and a lower edge of the top surface of the second unit adjacent the second display module has a reduced width relative to side edges adjacent the display modules.

10. The portable computer of claim 7, wherein at least one hinge unit connecting the first unit and the second unit with each other, the hinge unit being coupled to said rear ends of the first unit and the second unit so as to enable the first display module and the second display module to overlap each other or to be unfolded until they are placed in an equal plane, and wherein at least one of the first display module and the second display module has a touch screen function, and the first display module and the second display module display different images or divided portions of one integrated image.

11. The portable computer of claim 6, wherein the hinge link has an engagement protuberance formed at a distal end of the hinge link, and the movable hinge bracket has an engagement protuberance channel, in which the engagement protuberance is located and guided, and wherein the engagement protuberance prevents the hinge link from being separated from the movable hinge bracket when the engagement protuberance is engaged with a lower end of the engagement protuberance channel.

12. The portable computer of claim 11, wherein the hinge link has a hinge link connector extending between the first and second units and a plurality of stopper grooves along opposing lengthwise sides thereof, wherein the movable hinge bracket includes a guide section having an opening thereof in which is arranged guide rails for guiding said opposing lengthwise sides of the hinge link connector and at least one stopper hole in which the stopper is attached, and wherein the stopper is affixed to the movable hinge bracket and has a resilient protrusion projecting inward of the guide section through the stopper hole to engage the stopper grooves.

13. A hinge unit of a portable electronic device, the hinge unit comprising:
- a fixed hinge plate fixed to a first unit having a first display module, the fixed hinge plate having a first hinge connector;
- a hinge link having a first hinge shaft rotatably coupled to the first hinge connector, the hinge link connecting the first unit with a second unit having a second display module;
- a movable hinge bracket assembled with the second unit and configured to be rotated about a second hinge shaft, the movable hinge bracket having a guide section for guiding the hinge link that is movably coupled to the movable hinge bracket; and
- a stopper disposed at a corresponding portion between the hinge link and the guide section of the movable hinge bracket to control the hinge link movement with respect to the movable hinge bracket, wherein the hinge unit is positioned along a lateral area between the second display module and an outer lateral edge of the second unit, and wherein the hinge unit is coupled to rear ends of corresponding sides of the first unit and the second unit to enable the first display module and the second display module to overlap each other or to be unfolded until they are placed in an equal plane.

14. A portable computer, comprising:
a first unit having a first display module;
a second unit being capable of being folded on and unfolded from the first unit; and
a hinge mechanism configured to support reciprocal folding movements of the first and second units, wherein the hinge mechanism is positioned along a lateral area between the first display module and an outer lateral edge of the first unit, wherein the hinge mechanism comprises,
- a fixed hinge plate fixed to the first unit, the fixed hinge plate having a first hinge connector through which a hinge connection is formed,
- a hinge link rotatably coupled about a first hinge shaft to the first hinge connector, the hinge link assembled with the first unit and the second unit to connect the first unit and the second unit with each other,
- a movable hinge bracket assembled with the second unit in such a manner that the movable hinge bracket can be rotated about a second hinge shaft, the movable hinge bracket having a guide section for guiding the hinge link that is movably coupled to the movable hinge bracket, and
- a stopper configured to resistively control the hinge link from relatively moving with respect to the movable hinge bracket, wherein the hinge link extends through hinge slots formed through rear ends of the first and second units to connect the first and second units with each other.

* * * * *